Patented Nov. 28, 1950

2,531,383

UNITED STATES PATENT OFFICE 2,531,383

STABILIZATION OF VISCOUS DISPERSIONS OF COTTONSEED PROTEINS

Jett C. Arthur, Jr., Metairie, La., assignor to United States of America as represented by the Secretary of Agriculture No Drawing. Application July 23, 1948, Serial No. 40,419

5 Claims. (Cl. 106—154)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to alkaline dispersions of cottonseed proteins, and has among its objects an improvement in the process of stabilizing such dispersions against changes in viscosity, stringiness, tackiness, clarity and other related properties, during aging and storage prior to their use in the production of finished products such as fibers, adhesives, sizes, and so forth.

In the production of the type of articles mentioned, it is convenient and often necessary to store the alkaline protein dispersion for sometime prior to utilization of the dispersion in the making of the articles. During storage, the dispersion tends to attain desirable properties, but once attained, the dispersion should remain stable until such time as it is used.

Dispersions of the type referred to have previously been stabilized by such means as maintaining an atmosphere of ammonia over their surfaces and by adding of chemicals such as xanthates. The maintenance of an ammonia atmosphere involves difficult problems of deaeration, sealing means and pressure controls. The addition of xanthates or other chemicals has not been satisfactory in control of viscosity, since there tends to be a marked increase in viscosity during storage often of the magnitude of several thousand poises. When the viscosities become too high, the dispersions cannot be used, especially in making the articles that require extrusion.

The present invention is an improvement over these processes, in general according to which a reducing sugar such as dextrose, maltose, and levulose, or mixtures thereof, is added to a mixture of the protein and water prior to addition of the alkali. Additional modifying agents customarily used in the art may also be employed. The reducing sugar may be used in proportions of from .45 to 4.5 parts, by weight, per 22 parts of the protein. The amount of water may be varied in the range from 88 to 220 parts per 22 parts of protein, but 100 parts is preferred.

Experiments show that with the invention the dispersions may be stored in excess of 50 hours without any appreciable change in viscosities.

The following examples illustrate the invention in greater detail:

Example I

An aqueous mixture containing 22 parts cottonseed protein, 0.5 part trichloroacetic acid, and 2 parts dextrose per 100 parts water was prepared by thoroughly mixing these ingredients at 25° to 40° C. Sodium hydroxide (2.7 parts) was thoroughly blended into the mixture, and trapped air bubbles removed by centrifugation.

The viscosity of this dispersion decreased from an original value of about 200 poises to 80 poises in 52 hours, after which time the viscosity decreased slowly with time and reached 76 poises in about 74 hours. The solution retained satisfactory flow properties for the entire 52-hour period.

In a parallel preparation in which the addition of dextrose was omitted, the viscosity of the solution decreased to less than 15 poises in four hours.

Example II

An aqueous alkaline dispersion containing 22 parts cottonseed protein, 2.7 parts sodium hydroxide, 0.5 part trichloroacetic acid, and 4 parts dextrose per 100 parts water was prepared following the procedure of Example I. On storing this dispersion for more than 400 hours, the viscosity did not measurably change from the original value of 200 poises, and after storage for four months in a closed container, it still maintained its original viscosity.

Example III

An aqueous alkaline dispersion containing 22 parts cottonseed protein, 2.7 parts sodium hydroxide, 0.5 part trichloroacetic acid, and 4 parts maltose per 100 parts water was prepared following the procedure of Example I. On storing this dispersion for more than 160 hours, the viscosity did not measurably change from its original value of about 200 poises, and it possessed satisfactory flow properties.

Example IV

An aqueous alkaline dispersion containing 22 parts cottonseed protein, 2.7 parts sodium hydroxide, 0.5 part trichloroacetic acid, and 4 parts levulose per 100 parts water was prepared following the procedure of Example I. On storing this dispersion for more than 150 hours, the viscosity did not measurably change from its original value of about 200 poises, and it possessed satisfactory flow properties.

Having thus described the invention, what is claimed is:

1. A process of stabilizing the viscosity of a dispersion of cottonseed proteins comprising forming a mixture of the proteins, water, a reducing sugar, in the proportions of from 88 to 220 parts water and .45 to 4.5 parts reducing sugar per 22 parts of protein, and an alkali.

2. The process of claim 1, wherein the reducing sugar is maltose.

3. The process of claim 1, wherein the reducing sugar is dextrose.

4. The process of claim 1, wherein the reducing sugar is levulose.

5. An alkaline cottonseed protein dispersion comprising from 88 to 220 parts water per 22 parts of the protein, an alkali, and from .45 to 4.5 parts reducing sugar as a stabilizer of its viscosity.

JETT C. ARTHUR, JR.

REFERENCES CITED

The following references are of record in the file of this patent:

UNITED STATES PATENTS

| Number | Name | Date |
| --- | --- | --- |
| 2,145,317 | Salsberg | Jan. 31, 1939 |
| 2,271,620 | Brier et al. | Feb. 3, 1942 |
| 2,433,849 | Lathrop et al. | Jan. 6, 1948 |

OTHER REFERENCES

Pages 658–662 of the June number, 1946, of the Industrial and Engineering Chemistry.